United States Patent [19]

Stoy

[11] 4,379,874
[45] Apr. 12, 1983

[54] POLYMER COMPOSITION COMPRISING POLYACRYLONITRILE POLYMER AND MULTI-BLOCK COPOLYMER

[76] Inventor: Vladimir A. Stoy, 92 Clover La., Princeton, N.J. 08540

[21] Appl. No.: 166,032

[22] Filed: Jul. 7, 1980

[51] Int. Cl.³ .................... C08L 53/00; C08L 33/20
[52] U.S. Cl. .................................... 524/27; 525/93; 525/94; 525/192; 525/294; 525/296; 525/377; 524/388; 524/505; 524/732; 524/765; 524/827; 524/831; 524/850
[58] Field of Search ............... 525/93, 94, 294, 296, 525/336, 377, 192; 524/27

[56] References Cited

U.S. PATENT DOCUMENTS

| | | | |
|---|---|---|---|
| 2,940,952 | 6/1960 | Miller | 525/294 |
| 3,897,382 | 7/1975 | Stoy et al. | 525/336 |
| 3,926,930 | 12/1975 | Ohfuka et al. | 525/377 |
| 3,948,870 | 4/1976 | Stoy et al. | 525/336 |

*Primary Examiner*—Carman J. Seccuro
*Attorney, Agent, or Firm*—Louis E. Marn; E. M. Olstein

[57] ABSTRACT

There is disclosed a process for producing a novel polymer composition comprised of a polyacrylonitrile polymer and a block copolymer with acrylonitrile and non-crystalline polymer sequences wherein the polymer composition is formed by the removal of a solvent from a solution of a polyacrylonitrile polymer and a block copolymer with acrylonitrile and non-crystalline polymer sequences.

10 Claims, No Drawings

POLYMER COMPOSITION COMPRISING POLYACRYLONITRILE POLYMER AND MULTI-BLOCK COPOLYMER

FIELD OF INVENTION

This invention relates to novel polymer compositions including polyacrylonitrile polymers and more particularly to novel polymer compositions including polyacrylonitrite polymers and block copolymers with an acrylonitrile sequence, and process for preparing same.

BACKGROUND OF INVENTION

Crystalline polyacrylonitrile polymers have been produced for many years and are basically utilized in the production of acrylic and modacrylic textile fibers. Polyacrylonitrile polymers have several distinguishing structural features and physical properties including high degree of crystallinity with little amorphous phase; orientable at temperatures of about 100° C.; poor mechanical properties in an unoriented form and non-melting. Notwithstanding low production costs and some desirable properties, polyacrylonitrile polymers have only found limited commercial usages primarily including thin-walled articles prepared directly from solution and exhibiting enhanced mechanical properties after orientation.

Block polymers of an acrylonitrile sequence with another polymer sequence, for example, acrylamide are a two phase structure separated into domains wherein the acrylonitrile domain has like crystalline structure to polyacrylonitrile polymer. Such a block copolymer may be readily formed by the controlled acid hydrolysis of polyacrylonitrile polymer and are highly swellable in water with a swelling capacity dependent on the ratio of both sequences and on the number of separate domains. Generally, such a block copolymer exhibits considerable strength in the swollen state caused by the two phase structure and crystallinity of the acrylonitrile domains. Such block copolymers have been shaped by pressure in the swollen state or from thermo-reversible gels (TRG), such as disclosed in U.S. Pat. Nos. 4,053,442 and 4,173,606, respectively.

OBJECTS OF THE INVENTION

An object of the present invention is to provide a novel polymer composition.

Another object of the present invention is to provide a novel polymer composition comprised of a mixture of polyacrylonitrile polymers and block copolymers of acrylonitrile with a non-crystalline polymer sequence.

Still another object of the present invention is to provide a novel polymer composition comprised of a mixture of polyacrylonitrile polymers and block copolymers of acrylonitrile with a non-crystalline polymer sequence and exhibiting the more desirable properties of the respective polymers.

A still further object of the present invention is to provide a novel polymer composition comprised of a mixture of polyacrylonitrile polymers and block copolymers of a arylonitrile polymers with a non-crystalline polymer sequence and capable of forming bulky articles.

A further object of the present invention is to provide a novel polymer composition comprised of a mixture of polyacrylonitrile polymers and block copolymers of acrylonitrile with a non-crystalline polymer sequence and capable of being stretched or oriented at room temperatures.

Still another object of the present invention is to provide a process for preparing such a novel polymer composition.

A further object of the present invention is to provide a process for preparing such a novel composition from polyacrylonitrile polymers and block copolymers of acrylonitrile with a non-crystalline polymer sequence.

A still further object of the present invention is to provide a process for preparing such novel composition from polyacrylonitrile polymers and block copolymers of acrylonitrile with a non-crystalline polymer sequence in a form for facile subsequent processing.

SUMMARY

These and other objects of the present invention are achieved by forming in a solvent system a solution of polyacrylonitrile polymers and block copolymers of acrylonitrile with non-crystalline polymer sequence and subsequently removing the solvent system to form a novel polymer composition. In one aspect of the present invention, the properties of the novel polymer composition are preselectable by varying the molecular weight and/or weight percent of polyacrylonitrile polymer in the solution and by varying the molecular weight and/or weight percent of polyacrylonitrile polymer in the solution and by varying the molecular weight, weight percent and/or lengths of the acrylonitrile and non-crystalline polymer sequences of the block copolymers as well as by the functional groups of the non-crystalline polymer sequence.

DETAILED DESCRIPTION OF PRESENT INVENTION

The polymer composition of the present invention is produced by forming in a solvent system a solution of polyacrylonitrile polymers and block of copolymers of acrylonitrile with non-crystalline polymer sequence and subsequently removing thesolvent system. The term polyacrylonitrile polymer, as used herein, is defined as polymers and copolymers of acrylonitrile containing more than 85 molar percent of acrylonitrile units being crystalline in the solid state and exhibiting a typical X-ray diffraction pattern of of polyacrylonitrile (i.e. the main reflexion corresponding to a periodicity of 5.1 A and lateral orientation under stress).

The term block copolymers of acrylonitrile with a non-crystalline polymer sequence is the block copolymer having an acrylonitrile sequence and another polymer sequence, a two phase structure with an acrylonitrile domain and a polymer domain of polar groups wherein the acrylonitrile domain exhibits like crystalline structure to polyacrylonitrile and the polymer domain exhibiting an amphorus structure. The acrylonitrile sequence is a continuous sequence of acrylonitrile units of a mean molecular weight of at least about 500. The polar groups increase the moldulus of elasticity and slip limit of the polymer composition in the dry state. Additionally, the term block copolymer includes multi-block copolymers, i.e. two or more sequences each and generally preferably at least three sequences with the sequence for the non-crystalline polymer sequence formed of at least about 10 units. The amount of the acrylonitrile sequence of the block copolymer is from about 75 to about 1 weight percent, preferably of from about 50 to about 5 weight percent based on the polymer composition.

For one set of polymer composition, the amount of polyacrylonitrile polymer in such polymer composition is from 50 to 99 percent by weight, preferably 50 to 95 percent by weight of a molecular weight, of from 30,000 to 1,500,000, preferably 50,000 to 1,000,000 with the non-crystalline polymer sequence amounting to from 0.2 to 15 percent by weight, preferably 1.0 to 10 percent by weight of a molecular weight of from 3,000 to 1,500,000, preferably 10,000 to about 500,00. For a polymer composition exhibiting physical properties of increased tensile strength in both the dry and swelled state and of increased thermal stability in the swelled state, the amount of polyacrylonitrile polymers is from 0.5 to 40 weight percent, preferably 1.0 to 25.0 weight percent with the non-crystalline polymer sequence amounting to 30 to 99 weight percent, preferably 30 to 90 weight percent.

As hereinabove discussed, the amount of the block copolymer in the polymer composition may vary between 0.2 to 99 weight percent with small concentrations improving the properties of the polymer composition since the non-crystalline polymer sequence functions as a surface-active agent. The swellability of the polymer composition increases with increasing concentrations of the non-crystalline polymer sequence and thus end usage of the polymer composition determines the amount of non-crystalline polymer sequence. It is noted that a polymer composition having an amount of the non-crystalline polymer sequence in excess of about 20 weight percent is significantly swellable in solvents of the non-crystalline polymer sequence.

The properties of the polymer composition are also dependent on the molecular weight of polyacrylonitrile polymer and the block copolymer. Generally, the component present in minor amounts in the final composition can have a rather low molecular weight without loss of the mechanical properties of the polymer composition. The molecular weight of the minor component should be at least about 3,000 and preferably more than about 10,000, while the molecular weight of the major component should be at least about 30,000 and preferably at least 50,000. The upper values of molecular weight are limited by processability of the composition. The molecular weight of the minor component should not exceed about 1,000,000, with a preferably upper limit of about 500,000. As a rule, the molecular weight of the major component as high as 1,500,000 are processable.

The processing properties of the solution also depend on the molecular weights of each polymer component as well as their weight ratios. For ease of processing, rather low molecular weights of both polymer components are preferred with a range of between 40,000 and 250,000 usually satisfying demands of both processing and properties of the final product.

The properties of the polymer composition are also dependent on the number of acrylonitrile and non-crystalline polymer sequences per block in copolymer. Increased number of sequences per block copolymer chain increases the stability of the adsorption of the acrylonitrile sequence on the polyacrylonitrile surface.

A preferred polymer composition is obtained when the non-crystalline polymer sequence of the block copolymer is formed by units of highly polar groups of a volume larger than the volume of a nitrile group. Such units include the acrylamide, N-substituted acrylamide, acrylic acid, salts of acrylic acid, esters of acrylic acid, hydrazides of acrylic acid, N-substituted hydrazides of acrylic acid and glutarimide. An advantage of such units is that they can formed by reactions of the cyano groups in the polyacrylonitrile polymer. Also advantageously significant is the use of a block copolymer where the non-crystalline polymer sequence are formed by two or more different groups, e.g., copolymers of acrylamide with acrylic acid or with N-substituted acrylamide or with an ester of acrylic acid, etc.

Generally, the solvent system includes at least a solvent for polyacrylonitrile polymer, such as dimethylsulfoxide, dimethylformamide, demethyl acetamide, dimethyl methoxyacetamide, N-formyl morpholine, N-formylhexamethylene imine, cyclic hexamethylene sulfone, 1,2,3-trithiocyano propane, gammathiocyanobutyronitrile; some cyclic lactones and lactames; carboxylic acids, such as formic acid and halogenacetic acids, nitric acid with a concentration higher than 50%, 70 to 85% sulphuric acid, hydrofluoric acid, phosphoric acid, cyclic ethylene carbonate, aqueous solutions of zinc chloride, lithium, potassium, sodium or calcium rhodanide, alkali metal perchlorates, lithium bromide, etc. Another suitable solvent systems are solutions of the above solvents with minor amounts of solvents capable of solvating the non-crystalline polymer sequence, e.g. water, glycols or glycerols, if the non-crystalline polymer sequence consists of the highly polar groups, such as acrylamide.

The range of concentration of the polymer components i.e. polyacrylonitrile polymer and block copolymer in the solution is from about 5 to about 80 percent by weight, advantageously from 15 to about 70 percent by weight. At concentrations above about 35 percent by weight, the solution may be processed by heavy equipment such as extruders, calanders, kneaders, presses and the like because highly concentrated solutions behave more as a gel or a rubber than as a solution. Such highly concentrated solution yield very compact products with small amounts of solvents to be recovered with processing advantageously effected at elevated temperatures, which as a rule, is limited to the boiling point of the solvent.

At a concentration range of from about 15 to about 30 percent by weight of the solution, the polymer composition may be processed from the solution or by the TRG method to produce membranes, tubings, fibers, layers on substrates, etc.

A polymer composition with high concentration of the non-crystalline polymer sequence is thus substantially swellable with solvents therefor, and can be advantageously processed by these methods since swelling of the final article diminishes the contraction caused by the solution-solid transition. The TRG method for processing a polymer composition differs from the same method used for processing the polyacrylonitrile of the multiblock copolymers, Since higher concentration of the polymer components can be used yielding stronger, tougher and more stable products.

Formation of the polymer solution of the polymer components in a solvent system may be effected in a plurality of methods. In one method, the polymer components are dissolved in the common solvent using stirring, kneading and homogenization equipment. The concentration of the polymer components in the mixture is limited by the viscosity which allows homogenization. Such method is preferred for the preparation of low concentrate solutions, and permits the use of heavy homogenization equipment to prepare solutions containing as much as 50 percent by weight of the polymer components. Additionally the use of inert solvents, in such a solution permits operation at elevated temperatures thereby facilitating homogenization.

Another method involves the polymerization of acrylonitrile in a block copolymer solution and is advantageous in the preparation of very viscous mixtures without resort to homogenization equipment. One preferred solvent for such method is a zinc chloride solution permitting of the preparation of the mixture without isolating any intermediate product. This method is suitable for the preparation of a product of the polymer composition with fibers and fillers, since the fibers and/or fillers may be added to the solution before completion of the polymerization of the acrylonitrile, i.e. at low viscosities of the solution.

Still another method comprises the formation of the block copolymer in a polyacrylonitrile solution, preferably preparing the block copolymer of acrylonitrile with the non-crystalline polymer sequence from the polyacrylonitrile units, e.g. by the hydrolysis of polyacrylonitrile polymer in the presence of 50 to 72 weight percent nitric acid to yield a multiblock copolymer having acrylonitrile and acrylamide sequences. The hydrolysis of polyacrylonitrile polymer is an accelerating reaction with the rate strongly decreasing with increasing concentration of the polyacrylonitrile polymer in solution. It is also known that the monomeric acrylonitrile acts as a precititant for polyacrylonitrile polymer.

It has been found that the polymerization of acrylonitrile in nitric acid is accompanied by the precipitation of solid polyacrylonitrile polymer, if the initial concentration of acrylonitrile is sufficiently high and/or the temperature is sufficiently low. As the polymerization proceeds and the concentration of acrylonitrile decreases, the precipitated polyacrylonitrile polymer slowly dissolves into solution and the dissolved portion initiates hydrolysis at a low concentration of polyacrylonitrile polymer in solution while the remaining precipated portion is protected against hydrolysis. The dissolved portion of the polyacrylonitrile polymer has a considerable start before hydrolysis of the precipatated portion thereof which time difference leads to a considerable difference in the hydrolysis conversion whereby multiblock copolymers are always simultaneously present in the mixture with intact polyacrylonitrile chains. The resulting distribution of the hydrolysis conversion per polyacrylonitrile polymer chain is considerably broadened with a result similar to a mixture prepared by dissolving polyacrylonitrile polymer and the respective block copolymers. Moreover, there are considerable local fluctuations in the hydrolysis conversion, i.e. the chains are concentrated in some locations and the intact polyacrylonitrile chains in other locations and improves the conditions of the separation of the phases.

This last method of solution formulation is technologically advantageous since concentrated solutions may be prepared in one step.

After formulation of the solution of the polyacrylonitrile polymer and the block copolymer, removal of the solvent system is effected to form the polymer composition as a result of polymer phase separation. The conditions of solvent removal directly influence the size of the crystalline domains and thus the properties of the resulting polymer composition.

The higher the viscosity of the solution at the moment of the polymer phase separation, the larger is the number of crystalline domains, and therefore, the larger is the apparent crosslinking density of the final polymer composition. Consequently, the modulus of elasticity increases as the swelling capacity decreases with increasing concentration of the polymer components in the solution at the moment of polymer phase separation.

Essentially, there are two methods of solvent removal, i.e. evaporation and extraction. The evaporation method dictates the need of a solvent system of required volatility (e.g. dimethysulfoxide), and yields a polymer composition of high apparent crosslinking density since polymer phase separation is effected by high concentrations of the polymer components, i.e. at high viscosities. Evaporation techniques produce a polymer composition which may be shaped into membranes, fibers, layers on textile substrates, etc.

Extracting techniques utilize a suitable solvent to extract the solvent system to coagulate the polymer composition. The extraction solvent is at least miscible with the polyacrylonitrile polymer solvent of the solvent system, let alone totally miscible with the solvent system, per se. Preferably such an extraction solvent is water or dilute aqueous solutions of the polyacrylonitrile solvents, such as the lower aliphatic alcohols (methanol, ethanol, isopropaniol and the like), glycerol, glycols and mixtures thereof. The extraction solvent should be miscible with polyacrylonitrile polymer solvents while simultaneously capable of precipitating polyacrylonitrile polymer.

As hereinabove mentioned, the properties of the polymer composition depend upon the viscosity of the solution at the moment of separation of the polymer phases. The viscosity of the solution may be selected within broad limits depending mainly upon the concentration of each polymer components in the solution. Highly swellable (that is, physically sparingly crosslinked) polymer compositions are preferably produced by coagulating diluted solutions (e.g. 10-25 percent by weight of the polymer components) whereas the non-swellable or slightly swellable polymer compositions are prepared by the coagulation or precipatation of highly concentrated, gelatinous or rubberlike solutions or mixtures.

The methods of solvent removal may be combined. If the mixture contains both a solvent and an extraction solvent, the resulting mixture forms a physical gel at a certain temperature and a solution above such temperature. Mixing a more volatile solvent, such as dimethylsulfoxide, with a less volatile extraction solvent, such as glycerol and evaporating a portion of the solvent above the gelling temperature, a separation of the polymer phases begins by cooling the solution to yield a tough gel which can be easily processed. The remaining portion of solvent and the extraction solvent may be separated by a more volatile liquid, such as water or methanol.

While the mechanism of formation of the polymer composition is not fully understood, it is believed that the crystalline domains of the acrylonitrile sequence of the block copolymer orient themselves with the polyacrylonitrile polymers with the non-crystalline polymer sequence congregating with themselves thereby forming ordered regions of crystalline domains or phases embedded in amorphorus matrix or vice versa, i.e. amorphorus domains or phases embedded in a crystalline matrix.

It will be appreciated that the solution may be shaped before polymer phase separation. Dilute, low-viscosity solutions may be shaped by extrusion through a nozzle into a coagulation bath or by spreading onto a textile support or substrate, etc. Any shaping technology is available for processing the polymer component solutions.

Highly concentrated solutions, which are more or less tough physical gels, may be shaped by methods used for soft plastics or polymer melts, e.g. pressing, punching, extrusion, calendaring, injection-molding, etc. Shaping is followed by evaporation or extraction of the solvents system. Shaping may also be effected during coagulation and/or during subsequent washing of the solvent residues in which case, shaping is accompanied by orientation.

The polymer composition may be shaped after all the polyacrylonitrile polymer solvents are removed, preferably by applying pressure at a temperature above 75° C. and advantageously above 120° C. Such shaping is accompanied by orientation of the crystalline domains of the polymer composition and thereby improving its mechanical properties. Shaping may be effected while the polymer composition contains some extraction solvent such as water or glycerol.

Water can be present in two forms, i.e. as true swelling water if the polymer composition is water-swellable, or as so called "aquagel water", if the polymer composition is essentially not water-swellable. Since aquagel water is not equilibrial, a polymer composition cannot again swell once such polymer composition is dried.

The aquagel water content in a polymer composition is about 50 percent by weight, and similar to polyacrylonitrile polymer coagulates under similar conditions.

The aquagel water in a polymer composition in an "aquagelous state" can readily be replaced by glycerol or the like. A polymer composition in an glycogelous state is more stable than a polymer composition in the aquagelous state. It has been found that the polymer composition of either an aquagelous or glycogelous states are very suitable for shaping at room temperature or at slightly elevated temperatures. The polymer composition even if completely dry can be shaped at temperatures between 10° to 210° C., preferably between 110° and 180° C. Shaping of the polymer composition in a dry state is especially useful for final shaping and orientation of an article of the polymer composition.

Polymer composition may be produced exhibiting many desirable physical properties depending on intended end use. For example, water-swellable polymer compositions may be utilized as very strong hydrogels for prosthetic medicine in the production of permeable membranes, hydrophillic fibers, etc.

Non water-swellable polymer compositions may be utilized as a replacement for plastic or metallic structural components where physical properties, such as low weight, high strength, high impact resistance, low flammability, corrosion resistance, etc. are important design considerations. Thus, such polymer compositions can be used as tubes, containers or the like in contact with hydrocarbons, such as gasolene, since such polymer compositions are completely impermeable for non-polar compounds. The polymer compositions may be combined with electro-conductive compounds to eliminate static charges. The property of low heat conductivity renders the polymer compositions a compatible outer laminate sheets with a foamed inner layer.

The water-swellable and non water-swellable polymer compositions may be readily combined to form laminates of mechanically strong layers with intermediate hydrogel layers. It is known that hydrogel-coated surfaces exhibit lower hydrodynamic resistance then untreated hydrophobic surfaces. Such decrease in hydrodynamic resistance is advantageously utilized either for transport of water, or for transport of a solid body through water. Therefore, hydrogel layers on ships, inner surfaces of pipes, centrifugal pumps, propeller blades and the like would increase the efficiency of the respective device. Non water-swellable polymer compositions can be readily provided with a hydrogel layer, either from the hydrogel-like species of the polymer compositions or from the hydrogelous block copolymer to achieve a strong and desirable connection with a hydrogel and a hydrophobic solid surface, e.g. a metal, a plastic or a hydrophobic plastic.

Such a connection may be effected in any one of a plurality of methods. Thus, by one method, an article formed of the polymer composition is covered with a solution of a block copolymer of acrylonitrile of an appropriate viscosity in a solvent system. Removal of the solvent system causes an integral hydrogel layer to be formed on the article. Another method includes the steps of overlaying such a preformed article with a polymer components solution with subsequent solvent removal. Still another method includes the casting of a two polymer component solution followed by solvent removal using extraction techniques to form connected layers of different properties. A further method would include contact between a preformed article of non water-swellable polymer composition and a solution including a swelling and a hydrolyzing agent to form in situ a superficial layer of a hydrogel.

EXAMPLES OF THE INVENTION

The following examples are illustrative of conditions for the process of the present invention and it is to be understood that the scope of the invention is not to be limited thereby.

EXAMPLE I

Fifteen (15) parts by weight of polyacrylonitrile polymer (M.W.—175,000) are dissolved in 85 parts by weight of 65% nitric acid and the solution maintained at 10° C. until about 75 molar % of the cyano groups are hydrolyzed. To the solution cooled to −5° C., there is added 3.75 parts by weight of polyacrylonitrile polymer (M.W.—25,000). The solution is stirred to dissolve the polyacrylonitrile polymer with the resulting solution being extruded through an annular orifice into a water coagulation bath. The thus formed hydrogel membrane exhibited improved properties of increased tensile strength and reduced increase of the swelling capacity with increasing temperature, as compared to a hydrogel prepared without the subsequent introduction of a non-hydrolyzed polyacrylonitrile polymer.

EXAMPLE II

Ten (10) parts by weight of polyacrylonitrile polymer (M.W.—350,000) are dissolved in 70 parts by weight of aqueous 60 percent by weight solution of NaSCN to which is added 5 parts by weight of NaOH dissolved in 15 parts by weight of 60 percent by weight NaSCN solution. The resulting solution is heated to 75° C. for several hours and the hydrolyzed polyacrylonitrile coagulated with water and acidified with diluted acetic acid. The resulting block copolymer containing about 45 molar % of cyano groups and both carboxilic and amidic groups, is dried and milled to a powder. Fortyfive (45) parts by weight of powdered polyacrylonitrile polymer, 5 parts by weight of the powdered block copolymer and 30 parts by weight of a very finely divided crystalline NaSCN are thoroughly mixed and evenly spread on a glass dish for subsequent steam exposure. The mixture gelatinated yielding a homogeneous rubber-like mixture which is then extruded into a 10 percent by weight solution of NaSCN, washed with water and pressed into the shape of a sheet.

EXAMPLE III

Twenty (20) parts by weight of polyacrylonitrile polymer (M.W.—550,000) are dispersed into a mixture of twenty (20) parts by weight of dimethyl sulfoxide (DMSO) and 80 parts by weight of isopropanol. One (1) part by weight of a diblock copolymer containing 70% mol. of AN and 30% mol. of styrene is added, with the dispersion being spread onto a tray having crimped polyester fibers arranged in a criss-cross fashion. Alcohol is evaporated into an oven, so that the residual DMSO dissolved the polymers components forming a reinforced rubber-like sheet. The sheet is stretched onto a positive mold and put into the oven until the DMSO is evaporated to produce a pre-formed sheet which is pressed and simultaneously oriented at 175° C.

EXAMPLE IV

The rubber-like sheet prepared in accordance with Example III is cut into strips and introduced into a screw extruder together with finely powdered ammonium carbonate. The barrel of the extruder is heated to 70° C. with its annular head heated to 150° C. An extruded foamed tube is withdrawn from the head and washed with hot water. The wet tube is filled with a solution of 7.5 percent by weight of NaOH and 42.5 percent by weight of NaSCN in water at 50° C. until a hydrogel layer is formed. The tube is then washed with water and dried. The resulting porous tube having an inner hydrogel lining exhibited excellent thermal-insulating capability and reduced hydrostatic resistance to water.

EXAMPLE V

An amount of 0.1 parts by weight of ammonium persulphate is dissolved in 50 parts by weight of 65% nitric acid, and 50 parts by weight of distilled acrylonitrile added to the solution. The solution is then poured into a polypropylene mold filled with a mat of 2.5 cm. long crimped polyacrylonitrile fibers (Orlon). The mold is placed into a water bath maintained at a temperature of 50° C. and is stored therein for 55 hours. The mold is thereafter opened and a sheet of rubber-like, turbid, reinforced composition is washed with water. A 10 mm. thick tough, china-like sheet is then rolled between crossed rollers heated to 110° C. to form a pre-formed sheet having a thickness of 3 mm. The sheet is pressed into a mold to form one half of a rectangular vessel of a final wall thickness of 1 mm. A vessel made of two such parts is tested as a gas tank.

EXAMPLE VI

The polymer composition prepared in accordance with Example I is dried, milled and dissolved in DMSO to yield a 20 percent by weight solution. The solution is heated to 120° C. with a 10 percent by weight of glycerol thereafter added. The resulting solution is poured onto a preformed sheet of the polymer composition prepared in accordance with Example V and slowly cooled to effect gelatination. The resulting laminate is washed with water, soaked with 10% aqueous glycerol and dried. The thus formed two layer laminate is shaped in a press to provide a panel for ship hull construction. The thickness of the laminate is about 6 mm. when the hydrogel is swelled with water.

While the invention has been described in connection with several exemplary embodiments thereof, it will be understood that many modifications will be apparent to those of ordinary skill in the art; and that this application is intended to cover any adaptations or variations thereof. Therefore, it is manifestly intended that this invention be only limited by the claims and the equivalents thereof.

What is claimed is:

1. A novel polymer composition comprised of polyacrylonitrile polymer and a multiblock copolymer with acrylonitrile and non-crystalline polymer sequences with an average number of said sequences per multiblock copolymer being equal and at least 2, said acrylonitrile sequence having a mean molecular weight of at least 500, said non-crystalline polymer sequence being comprised of at least about 10 units and constituting one or more highly polar units selected from the group consisting of acrylamide, N-substituted acrylamide, acrylic acid, esters of acrylic acid, salts of acrylic acid, hydrazides of acrylic acid and glutarimide.

2. The polymer composition as defined in claim 1 wherein said polyacrylonitrile polymer comprises of from 50 to 99 percent by weight of said polymer composition and has a molecular weight of from 30,000 to 1,500,000.

3. The polymer composition as defined in claim 2 wherein said polyacrylonitrile preferably comprises of from 50 to 95 percent by weight of said polymer composition and said molecular weight is from 50,000 to 1,000,000.

4. The polymer composition as defined in claim 2 or 3 wherein said non-crystalline polymer sequence comprises from 0.2 to 15 percent by weight of said polymer composition and said block copolymer has a molecular weight of from 3,000 to 1,500,000.

5. The polymer composition is defined in claim 4 wherein said non-crystalline polymer sequence comprises of from 1 to 10 percent by weight and has a molecular weight of from 10,000 to about 500,000.

6. The polymer composition as defined in claim 1 wherein said polyacrylonitrile polymer comprises 0.5 to 40 percent by weight and said non-crystalline polymer sequence comprises 40 to 99 percent by weight of said polymer composition.

7. The polymer composition as defined in claim 6 wherein said polyacrylonitrile polymer preferably comprises 1 to 25 percent by weight and said non-crystalline polymer sequence comprises 50 to 90 percent by weight of said polymer composition.

8. The polymer composition as defined in claim 6 wherein said polyacrylonitrile polymer has a molecular weight of from 30,000 to 1,500,000 and said multiblock copolymer has a molecular weight of from 10,000 to about 500,000.

9. The polymer composition as defined in claim 1 and including 0.5 to 90 weight percent of a material selected from the group consisting of water, glycerol, alkyene, glycol and sugar.

10. The polymer composition as defined in claim 9 wherein said material is present in an amount of from 2 to 55 weight percent.

* * * * *